United States Patent [19]

Weir

[11] Patent Number: 5,320,264

[45] Date of Patent: Jun. 14, 1994

[54] ADJUSTABLE VEHICLE CARGO CARRIER CONSTRUCTION

[75] Inventor: H. Perry Weir, Advance, N.C.

[73] Assignee: Perrycraft, Inc., Winston-Salem, N.C.

[21] Appl. No.: 3,008

[22] Filed: Jan. 11, 1993

[51] Int. Cl.⁵ .............................................. B60R 9/058
[52] U.S. Cl. .................................... 224/321; 224/326; 224/329
[58] Field of Search ................ 224/321, 322, 324-327, 224/329, 331

[56] References Cited

U.S. PATENT DOCUMENTS

| | | |
|---|---|---|
| 3,253,755 | 5/1966 | Bott . |
| 3,719,313 | 3/1973 | Tischler . |
| 3,837,547 | 9/1974 | Joos .................................... 224/331 |
| 4,244,501 | 1/1981 | Ingram . |
| 4,245,764 | 1/1981 | Kowalski et al. . |
| 4,270,681 | 6/1981 | Ingram . |
| 4,295,588 | 10/1981 | Kowalski et al. . |
| 4,358,037 | 11/1982 | Heideman . |
| 4,487,348 | 12/1984 | Mareydt . |
| 4,765,522 | 8/1988 | Bell . |
| 5,104,020 | 4/1992 | Arvidsson et al. . |
| 5,133,490 | 7/1992 | Cucheran .............................. 224/321 |

Primary Examiner—Renee S. Luebke
Attorney, Agent, or Firm—Wigman, Cohen, Leitner & Myers

[57] ABSTRACT

A pair of like rails are secured to a vehicle roof regardless the curvature of the roof surface at the rails to the plane of the roof between the rails. Two pairs of stanchions to which a corresponding crossbar is secured are slidably secured to the rails and slid into the desired position along the rails. The stanchions have a groove and surface defining a space in which a rail tongue having a circular end surface and an opposing rail circular surface are located to form a pivot arrangement forming a stanchion-rail pivot axis. The stanchion is formed of two members which are pivotally secured about an axis spaced from the rail pivot axis with a clamping knob located between the spaced pivot axes. The knob urges the members together and to the rail to form a tight clamping action to preclude the stanchions from sliding along the rails in response to wind and cargo loads. A plurality of tie down eyelets are slidably secured to a mating trapezoidal groove in the rails and arranged so that the eyelets when under load are tightly secured in place by the load.

30 Claims, 4 Drawing Sheets

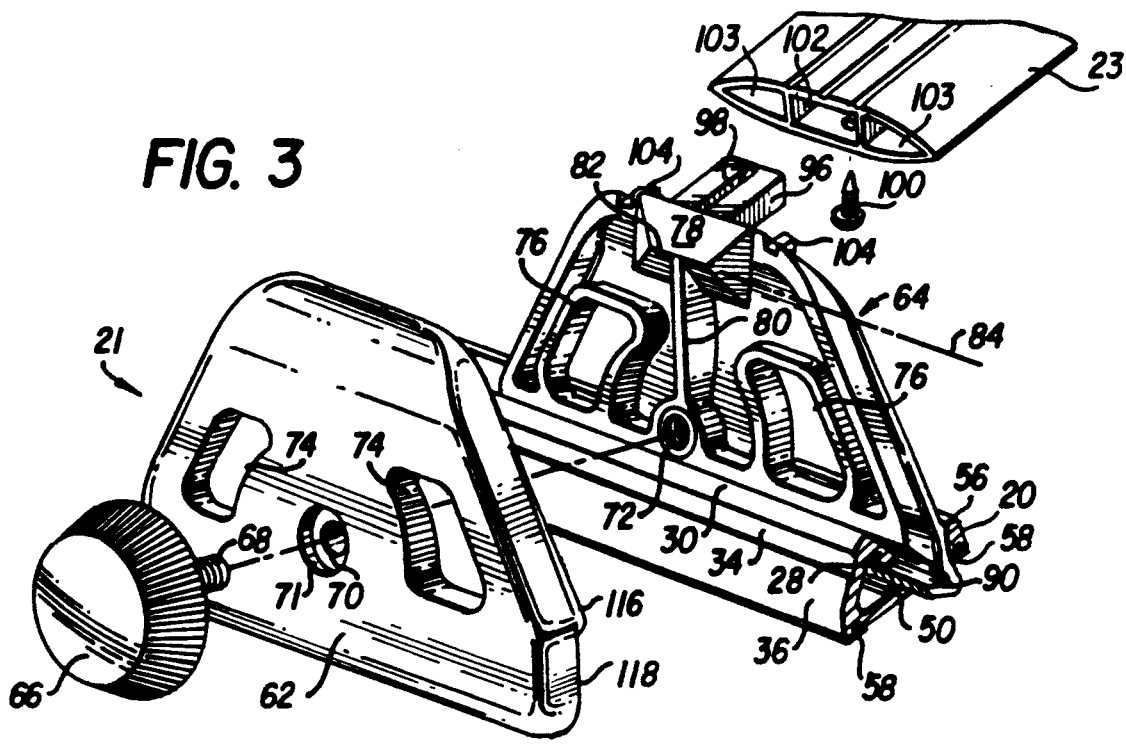

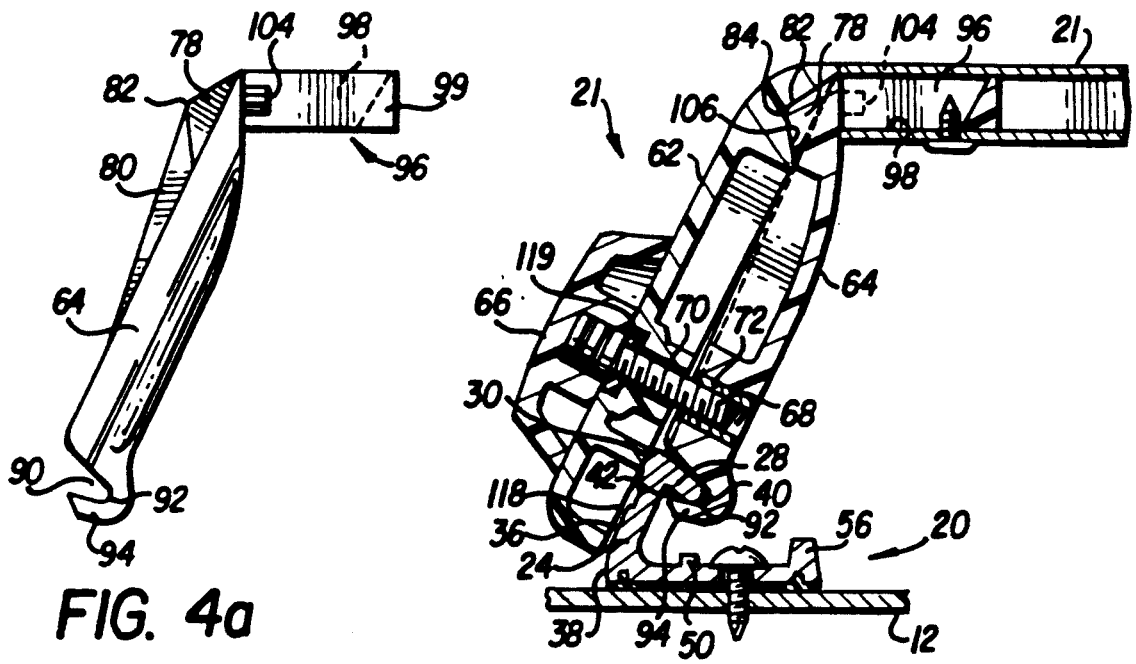
FIG. 4a
FIG. 4b
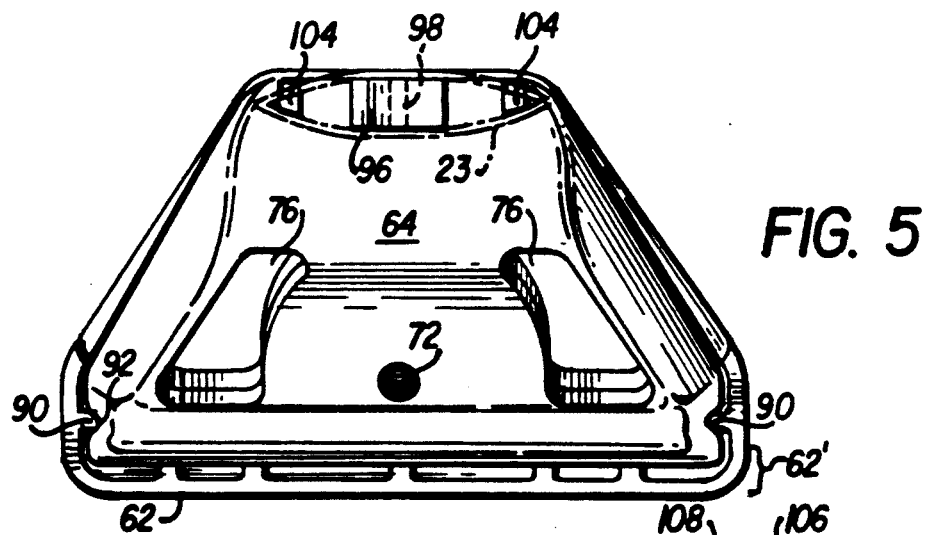
FIG. 5
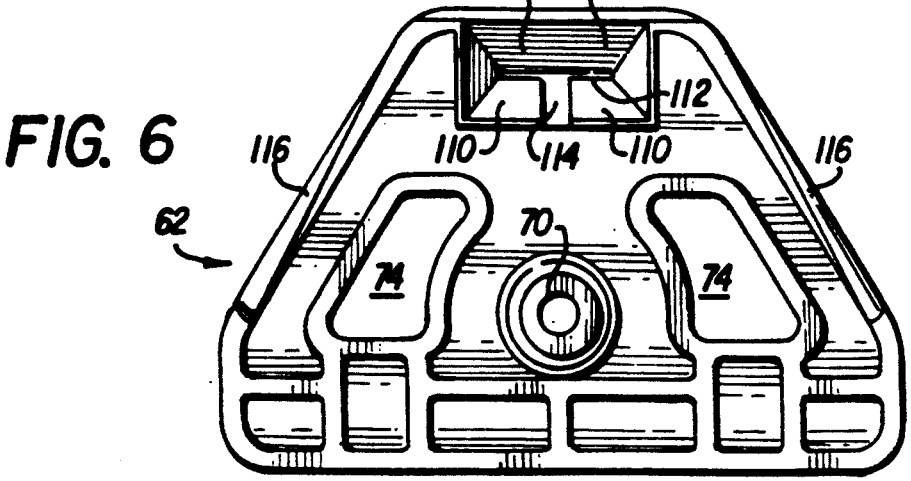
FIG. 6

ADJUSTABLE VEHICLE CARGO CARRIER CONSTRUCTION

FIELD OF THE INVENTION

The present invention relates to adjustable automotive cargo carriers and, more particularly, to cargo carriers with rail and stanchion assemblies in which the stanchion assemblies can slide along the rail which forms a track, the stanchion assemblies including crossbars secured thereto for supporting a cargo load.

BACKGROUND OF THE INVENTION

In track style cargo carriers for vehicles, sometimes referred to as luggage racks or other nomenclature, a pair of track rails are secured on opposite sides of a vehicle roof running in a front to rear orientation. The rails are fastened to the roof and typically two molded thermoplastic stanchions are secured to each rail. Cargo supporting crossbars are secured to the stanchions transverse to the rails. The stanchions are slidably secured to the rails so that they may be positioned in the forward-rearward direction according to a given cargo load size. The rails generally comprise a channel member in which a T-shaped key member is fitted which slides along the channel. The key member may be a separate metal element secured to the stanchion by a fastener or the stanchion may be molded with a key structure therein.

For example, key type structures are disclosed in U.S. Pat. Nos. 4,245,764 (which discloses a knob for clamping the elements together); 4,244,501; 4,270,681 and others. The key is clamped to the rail once it is positioned along the rail at the desired location. Other arrangements are also known which generally are similar to the aforesaid concept, as shown for example in U.S. Pat. No. 4,358,037 and others in which one member engages the other member of the rail structure.

All of the foregoing prior art devices suffer from a common drawback. In the aftermarket, automobile owners desiring to install a cargo carrier on their vehicle must purchase a commercially available unit for installation. These units, as disclosed in the aforementioned patents, comprise structures having rails which have a base adapted to be secured to a vehicle roof surface and which structures are designed on the assumption that the roof surface is generally flat and in a plane substantially parallel to the crossbars. However, numerous vehicles have roof contours which are not flat. The adjustable aftermarket cargo carriers of the prior art as described above do not have the versatility to be secured to vehicle surfaces with varying contours.

U.S. Pat. No. 3,719,313 addresses this problem to some extent. That patent discloses a rail support assembly in which the rail is disclosed as a member to which the luggage is secured as compared to the "rail" described above to which stanchions are secured. A resilient, one-piece base is adapted to conform to the contour of the vehicle roof and includes a spherical section forming a dome. A spherical socket mates with the dome, the elements being arranged to be fastened via a plate and flange assembly. This arrangement is not adjustable in the manner of the track structures described above. Once the dome is secured in place it cannot be easily moved about without removing the fasteners which is not desirable because this would leave damaging openings in the roof.

SUMMARY OF THE INVENTION

According to the present invention, in an adjustable vehicle cargo carrier, a rail and stanchion are included. The rail is elongated and defines an axis parallel to the rail, the rail being adapted for attachment to the vehicle. The stanchion is releasably and slidably secured to the rail for selective displacement along the rail, the stanchion including means for securing thereto a cargo support crossbar extending transversely of the rail axis. The stanchion and rail include means for rotatably securing the rail to the stanchion for relative rotation about the axis. This arrangement permits the rail to be secured to non-flat roofs while permitting the crossbar to extend over the roof in substantially parallel relation thereto.

According to one embodiment of the invention, the rail has first and second parallel curved surfaces each having a radius relative to a given center, the axis being defined by the center. The stanchion includes an inner and an outer member each having a surface for engaging a different corresponding one of the first and second surfaces, the first and second surfaces and the surfaces of the inner and outer members being arranged such that the stanchion and rail can rotate relative to each other about the given center.

With the foregoing advantages and features of the invention that will become hereafter apparent, the nature of the invention may be more clearly understood by reference to the following detailed description of the invention, the appended claims and to the several views illustrated in the drawings.

BRIEF DESCRIPTION OF THE DRAWINGS

FIG. 3 is an exploded view of the assembly of FIG. 2 taken from a different view angle;

FIG. 4a is a side elevation view of the inner section member of the stanchion;

FIG. 4b is a sectional side elevation view of the embodiment of FIGS. 2 and 3;

FIG. 5 is a plan view of the stanchion assembly of the embodiment of FIG. 2 viewing the inner section member engaged with the outer section member;

FIG. 6 is a plan view of the inside of the stanchion outer member section facing the inner member in the assembly of FIG. 2

FIG. 9 is an isometric view of the tie down eyelet of FIGS. 8a and 8b;

FIG. 10 is an isometric view of an end cap used to secure a rail end in place to a vehicle roof;

FIG. 11 is a sectional elevation view of the end cap of FIG. 10 as installed on a roof showing a rail being secured thereby; and FIG. 12 is a sectional view taken along line 12—12 of FIG. 11.

DETAILED DESCRIPTION OF THE INVENTION

Figure 1:
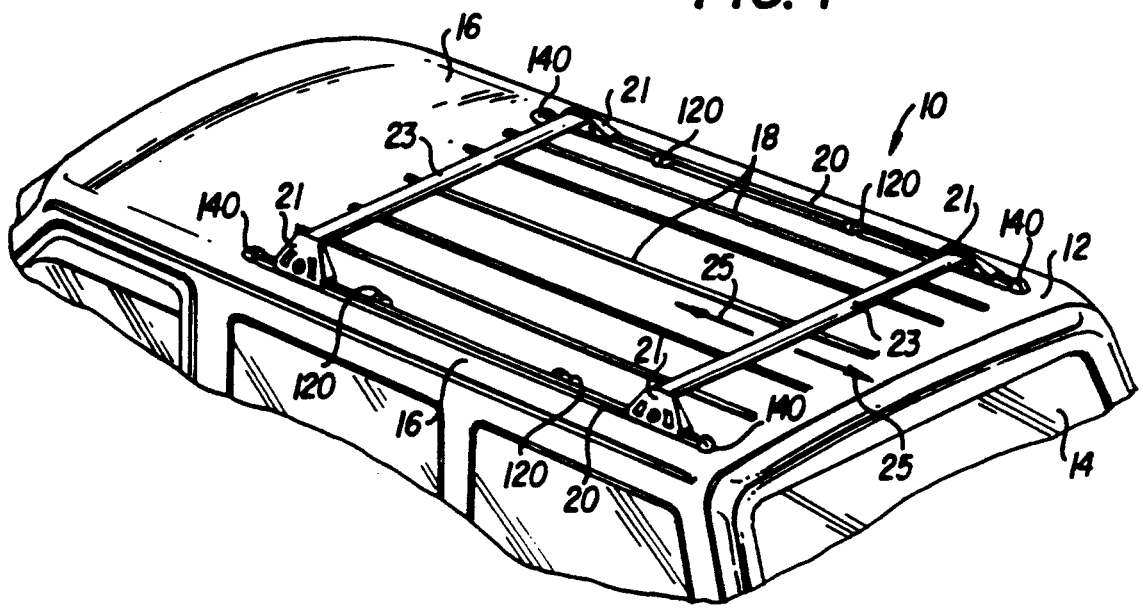
FIG. 1 is a perspective view of a cargo carrier according to one embodiment of the present invention.

Referring now in detail to the drawings wherein like parts are designated by like reference numerals throughout, as shown in FIG. cargo carrier 10 is secured to a roof 12 of a vehicle 14. The roof 12 is illustrated relatively flat but as will become apparent hereinafter, the roof may have a curved contour, especially at the locations 16 where the carrier 10 is attached to the roof. Additional cargo supporting guards 18, not part of the present invention, may be optionally installed on the roof 12 to preclude the cargo (not shown) from marring or damaging the roof surface.

Cargo carrier 10 comprises a pair of parallel identical rails 20 which are installed on opposite sides of the roof 12 in mirror image fashion and which extend from the front to rear of the roof in a typical cargo carrier orientation. Four identical stanchions 21 are secured to the rails 20, two stanchions being secured to one rail and the other two to the other rail. A crossbar 23 is secured to two opposing stanchions on opposite sides of the roof. The stanchions, as will be shown below, are releasably secured to the rails for permitting the stanchions to slide along the respective rails in the direction of arrows 25 and are selectively clamped to the corresponding rail when the crossbars 23 are in the desired front to rear position for a given cargo load (not shown).

The cargo carrier 10 of the present invention may be attached to a roof whose contour in different vehicles may differ from a flat surface to one which is oriented at angles of up to about 30° with the horizontal plane at the roof sides. The stanchions 21 are selectively pivotable relative to the corresponding rail to permit the rails to be secured to such contoured roofs and yet allow the crossbars 23 to extend in a substantially horizontal plane across the roof and mate with the stanchions. After the rails and stanchions are placed in the desired relative orientation, the stanchions are clamped securely to the rails.

Figure 8A:
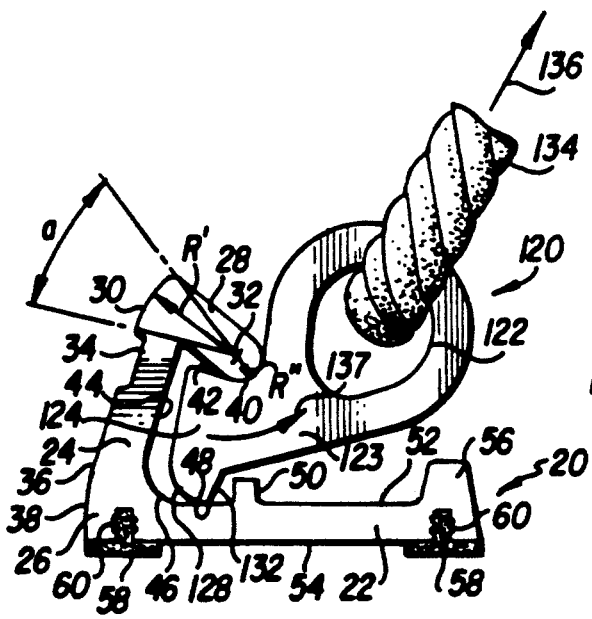
FIGS. 8a and 8b are side elevation views of the rail of the embodiment of FIG. 1 illustrating different operative and non-operative positions of a cargo tie down eyelet according to a further embodiment of the present invention.
Figure 8B:
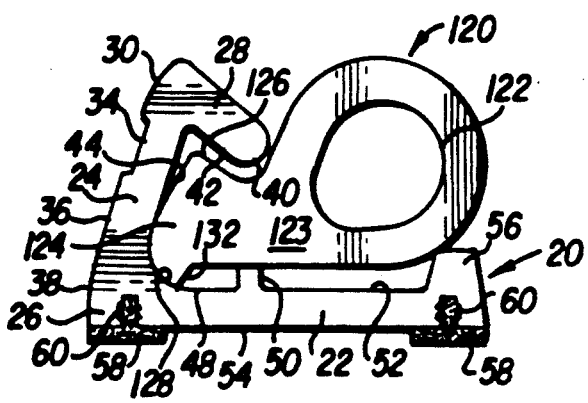

The rail 20 is preferably extruded aluminum having the transverse contour shown, for example, in FIGS. 8a and 8b, the rail extending into and out of the plane of the figure normal to the plane of the figure. The rail 20 comprises a base 22 lying in a horizontal plane in the drawing figure, an upstanding leg 24 which extends from a longitudinal edge 26 of the base canted at an angle, for example, about 70° with the horizontal plane and a tongue 28 which depends from the extended end of leg 24 toward the base 22 at an angle of preferably about 40° with the horizontal plane. Leg 24 has an arcuate surface 30 on an outer leg surface, surface 30 having a radius R' from longitudinal axis 32 which is parallel to the length dimension of the rail 20. Surface 30 subtends an angle a which may be about 35°–40°. A longitudinal groove 34 may be disposed in the outer surface of leg 24 and also extends for the length of the rail along axis 32. The outer rail surface 36 is planar and extends toward surface 38 which is slightly tapered relative to the vertical, e.g., 5°.

Tongue 28 has a semicylindrical end surface 40 having a radius R" extending from axis 32 which is a common center for the surfaces 30 and 40. This is an important feature as will be discussed below. The surface 42 of tongue 28 tapers somewhat to the point at which it is attached to leg 24 inner surface 44 relative to the tongue outer surface that joins surface 30. The inner surface 44 of leg 24 is formed into a relatively large radius surface 46 to where it merges with the base 22 upper surface 48 which slopes upwardly toward tongue 28 until it joins upstanding rib 50. Rib 50 extends for the length of the rail. Base 22 has a further upper surface 52 which is planar and parallel to the bottom surface 54 and extends from rib 50 to rib 56 which also extends for the length of the rail. A pair of vinyl strips 58 are attached to base 22 via serrated grooves 60 to form feet which protect the surface finish of vehicle roof 12 (FIG. 1) on which the feet rest.

Figure 2:
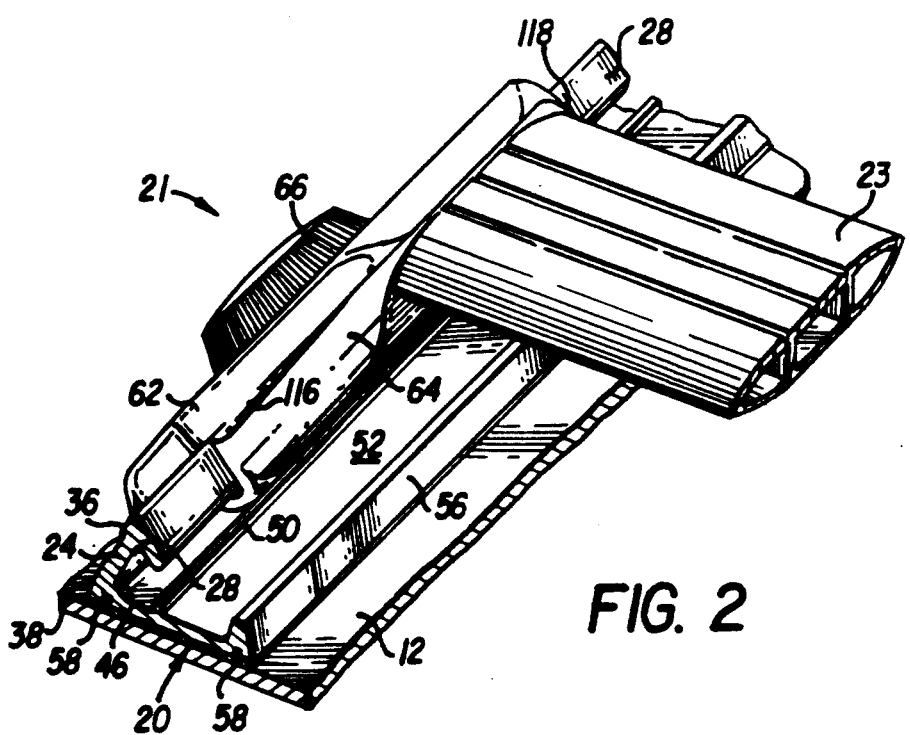
FIG. 2 is a fragmentary isometric view of an assembly of a stanchion, rail and crossbar according to the embodiment of FIG. 1.

In FIGS. 2, 3 and 4b, representative stanchion 21 comprises a "clam shell" arrangement including an outer section member 62, an inner section member 64, a clamping knurled knob 66 having a threaded stud 68 which passes through aperture 70 of outer section member 62 and engages the threads of threaded insert 72 attached to inner section member 64. Member 62 has a pair of tie down openings 74. Member 64 has a pair of tie down openings 76 aligned with openings 74 to form a pair of openings through which a tie down strap may be passed and secured to the stanchion 21. The term strap is intended to include cords, ropes and flat strap type structures typically used for cargo tie down.

In FIGS. 3, 4a and 5 the inner member 64, so called because it is the innermost member of the two installed stanchions 21 securing a crossbar 23, comprises an approximate trapezoidal shell made of molded thermoplastic material. The member 64 includes a pyramid-like elongated projection 78 and a rib 80 as best seen in FIGS. 3 and 4a. The projection 78 has an apex 82 which defines a pivot axis 84 about which member 64 can pivot relative to member 62 through a small angle when the two members are loosely clamped together. In FIG. 4a the member 64 includes an elongated, substantially V-shaped groove 90 having tapered side walls which terminate at a circular bottom wall 92 at the apex of the groove. Groove 90 has a side wall 94 which appears hook-like in side view (FIG. 4a). The configuration of the groove 90 is important because this groove receives the tongue 28 of the rail 20 in a pivotable or hinge-like manner as described hereinafter. End surface 40 of tongue 28 has a diameter such that the surface 40 is spaced from the circular bottom wall 92 when the tongue is fully inserted into the groove 90 as seen in FIG. 4b.

The contact points of the tongue surface 40 with the groove 90 side walls form a rotation bearing and journal arrangement in which the member 64 rotates about axis 32 (FIG. 8a). The tongue 28 does not contact bottom wall 92 thereby permitting the tongue to be forced somewhat into the groove in the fully clamped state of the members 62, 64 thereby forming a wedge-like action between the tongue and groove. This wedge action provides relatively high friction between the member 64 and rail tongue 28 to lock the two structures together in the longitudinal direction of axis 32. Because the thermoplastic material of the member 64 is somewhat resilient, even manual tightening of the knob 66 is sufficient to lock the member 64 to the rail so as to withstand wind loads on the cargo tied to the stanchions and crossbars.

A molded projection 96 (FIGS. 4a, 4b and 5) comprises two spaced members defining a slot 98 and an end element 99 integral with the two members. A screw 100 (FIG. 3) secures the crossbar 23 to the projection 96 which is closely received by a mating opening 102 in the crossbar 23. Two additional projections 104 extend from the member 64 and are positioned to be received in openings 103 of crossbar 23 to further align the crossbar.

In FIG. 6 outer section member 62 is also trapezoidal in plan view but has a length from the top to bottom of the drawing greater than the inner member 64 as seen in FIG. 5. Member 62 has a pyramid-like recess 106 shaped similarly as the projection 78 of member 64 for receiving that member 78. The taper of recess 106 is defined by sides 108, 110 and loosely mates with the side walls of projection 78 to permit the projection 78 to pivot through a small angle in recess 106. The apex 82 of the projection 78 abuts the rectangular bottom surface 112 of the recess 106 to define the pivot bearing axis 84 for these elements. Member 62 is also formed with a slot 114 which receives rib 80 of member 64. A pair of mirror image side ribs 116 lie flush with the tapered side edges of the member 62. These ribs cover the spacing or gap between the facing surfaces of the inner member 64 and outer member 62, which spacing is created when these two members pivot relatively about axis 84. By covering the spacing, aerodynamically smooth outer surfaces are provided for the stanchion. The side ribs 116 also assist in locating the members 62, 64 in the correct position relative to one another.

Figure 7:
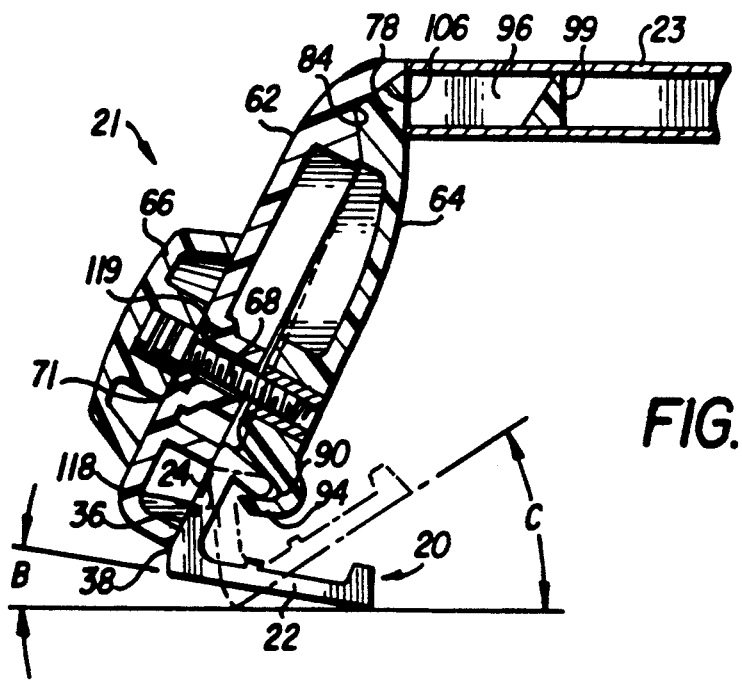
FIG. 7 is a view similar to that of FIG. 4b illustrating some of the principles of the present invention.

As seen in FIGS. 4b and 7, the lowermost region of member 62 at surface 118 can abut the surface 36 of the rail 20 (FIG. 7). Surface 118 also abuts arcuate surface 30 of rail 20 opposite the tongue 28 so that the surface 118 slides over surface 30 as the members 62 and 64 are rotated relative to the rail 20. An O-ring 119 retained on threaded stud 68 frictionally locks the knob 66 to a mating shoulder in an annular recess 71 in section member 62 to prevent vibrations from loosening the knob after tightening.

In FIG. 7 the extreme pivotal positions of the rail 20 relative to the stanchion 21 is shown by the location of the rail in solid and in dashed lines. The solid lines show the base 22 of the rail at an angle B to the horizontal, which may be about 10° and the dashed lines show the other extreme position of the base 22 of the rail which may be at an angle C of about 30° to the horizontal in the opposite direction as angle B. In the position shown in solid lines, the surfaces 118 and 36 abut and in the position shown in dashed lines, the wall 94 forming groove 90 abuts the wall 42 of the tongue 28.

It will be appreciated that the full range of pivoting of the stanchion 21 with respect to the rail 20, i.e., 40°, permits the rail to be mounted on a curved vehicle roof at various angles relative to the horizontal while still maintaining the crossbars in a horizontal plane as shown in FIG. 7. The rail gripping forces are also maintained substantially constant over that full range of pivoting for a given tightening force applied to knob 66.

In FIG. 9, a tie down eyelet 120 has a rope or strap receiving aperture 122. The eyelet 120 is preferably molded thermoplastic and is formed with a neck 123 and a generally trapezoidal end section 124 which is profiled to be received in the trapezoidal space of the rail 20 formed by tongue 28, leg 24 and base 22, as best seen in FIGS. 8a and 8b. In FIG. 9 trapezoidal section 124 has one edge 126 formed by tapered intersecting surfaces. The section 124 has a second end surface 128 which is curved and which is stepped from side 130 of the eyelet to form a shoulder 132. As best seen in FIGS. 8a and 8b, in response to the tension of a tie down rope 134 in direction 136, the eyelet 120 is pulled and rotated in the direction of the arrow 137 toward the rib 50 so that surface 128 engages the sloping surface 48 of the rail base 22. The neck 123 of the eyelet 120 wedges against surface 40 of tongue 28 while the shoulder portion 132 of eyelet 120 wedges against the sloping surface 48 locking the eyelet in place. In its untethered state shown in FIG. 8b, the eyelet is loose and free to slide longitudinally along the rail. In FIG. 8a the eyelet is wedged in place and can no longer freely slide along the rail thereby fixedly securing the tie down point for the load.

FIGS. 10, 11 and 12 show an end cap 140 comprising a hollow shell molded of a thermoplastic material and having an inner transverse wall 142 and a rib 144. A stepped countersunk aperture 146 is formed in projection 148 secured to wall 142. The aperture 146 receives a fastener 150 which secures the cap 140 to the roof 12 of a vehicle. The rail leg 24, base 22 and tongue 28 are received between rib 144 and the shell of cap 140 as seen in FIG. 11. The rib 50 and tongue 28 abut the rib 144 tightly securing the rail in place. The rail is also secured to the roof by spaced fasteners (not shown). Cap 140 is aerodynamically shaped to reduce air drag as are the crossbars 23 and stanchions 21.

In operation with the rails 20 attached to the vehicle roof 12, a pair of stanchions 21 attached at the opposite ends of a crossbar 23 are installed on the rails as follows. The stanchions 21 are loosely engaged to the rails by loosening knob 66 an amount sufficient for the rail to slip between the members 62 and 64 so that tongue 28 is in groove 90 and the surfaces 30 and 118 of the rail 20 and member 62, respectively, abut. The stanchions are then slid along the rails to the desired locations. In these locations the clamping knob 66 of each stanchion is tightened pivoting the members 62 and 64 about axis 84, until the rail is tightly clamped to the stanchion.

The shape of the groove 90 in inner member 64 is important and preferably is generally V-shaped with an included angle of about 30°. The dimensions of the aluminum extrusion forming the rails 20 may vary. The diameters of the arcs forming the arcuate surface 30 of tongue 28 may vary by several thousandths of an inch. The V-shaped groove 90 can accommodate some dimensional variation without detracting from the effectiveness of the clamping action.

Because of the relationship of the two arcuate surfaces 30 and 40 in emanating from a common axis 32 (FIG. 8a), the two stanchion members 62 and 64 can be drawn tightly against the rail consistently over the full pivot range of the rail relative to the stanchions, e.g., 40°. This allows for quick and easy adjustment of the crossbars along the length of the rails because the stanchions are free to slide without binding as long as the rails and stanchions are within their pivot range. There is thus provided according to the invention a cargo carrier construction that includes the desirable features of the prior art devices as well as the capability of easy mounting to vehicle roofs of various contours.

Although certain preferred embodiments of the invention have been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and the applicable rules of law.

What is claimed is:

1. An adjustable vehicle cargo carrier comprising:

an elongated rail defining an axis parallel to the rail, said rail being adapted for attachment to a vehicle, said rail including first and second curved surfaces each having a radius relative to a given center, said axis being defined by said center, said rail further including a leg and a tongue depending from the leg and extending along said axis, the first curved surface being formed on the leg and the second curved surface being formed on said tongue at an end thereof spaced from said leg; and a stanchion releasably and slidably secured to said rail for selective displacement along said rail, said stanchion including means for securing thereto a cargo support crossbar extending transversely of said axis, said stanchion and rail including means for securing said stanchion to the rail for relative rotation of said stanchion about said given center.

2. The carrier of claim 1 wherein said stanchion includes an inner and an outer member each having a surface for engaging a different corresponding one of said first and second curved surfaces, said first and second curved surfaces and said member surfaces being arranged such that said stanchion and rail can rotate relative to each other about said given center.

3. The carrier of claim 2 wherein the outer member engages said first surface and the inner member engages the second surface, said first surface having a radius larger than the radius of the second surface, the inner member surface being formed by a V-shaped groove having opposite inclined side walls wherein the second surface engages the groove side walls, the outer member surface being planar such that it slides over the first surface as the rail and stanchion rotate relative to one another.

4. The carrier of claim 3 wherein the rail includes a base member extending along said axis and adapted to be secured to a support, said leg extending from said base member.

5. The carrier of claim 3 including clamp means secured to the stanchion for releasably locking the stanchion to said rail, said clamp means including means for urging said inner and outer members in locking engagement with each other and with said first and second surfaces to preclude sliding of said stanchion relative to said rail along said axis.

6. The carrier of claim 1 wherein said means for securing a crossbar includes a crossbar receiving projection extending from said stanchion, and further including a crossbar secured to the projection.

7. The carrier of claim 6 including a second elongated rail spaced from and parallel to said elongated rail and a second stanchion secured to said second rail, said crossbar being secured to each stanchion.

8. The carrier of claim 7 wherein said stanchions each include cargo restraining means for securing a cargo to said stanchions.

9. An automotive cargo carrier comprising:
an elongated rail defining an axis parallel to the rail, said rail being adapted for attachment to said vehicle;
means for securing the rail to a vehicle surface;
a stanchion comprising first and second members arranged to pivot relative to one another at a first location and dimensioned to be releasably and slidably secured to said rail for selective displacement along said rail, said stanchion including means for securing thereto a cargo support crossbar extending transversely of said axis, said rail and stanchion members each having a plurality of surfaces and adapted to respectively engage at a second location spaced from said first location and, when engaged, permit said first and second stanchion members to pivot together about the axis defined by said rail at said second location;

means for urging said first and second member surfaces against said rail surfaces to engage and releasably lock the first and second members to said surfaces; and at least one cargo restraining element slidably secured to the rail for displacement along said axis when in a non-restraining condition, said element and rail being dimensioned such that the element locks in place to the rail when under tensile load during the restraining of said cargo.

10. The carrier of claim 9 wherein said rail includes a base, an upstanding leg and a tongue cantilevered from the leg to form a generally trapezoidal space between the base, leg and tongue, said element including a cargo tie down portion and a rail engaging portion, said rail engaging portion including opposing lips interlocked in said trapezoidal space such that rotation of the element in response to a cargo load locks the element in place to the rail.

11. The carrier of claim 10 wherein the rail includes a rib for further interlocking the rail engaging portion in said trapezoidal space.

12. A rail for use in a cargo carrier structure comprising:
a base extending along an axis and adapted to be secured to a vehicle support surface;
an upstanding leg secured to the base and extending along said axis; and
a tongue extending along said axis cantilevered from said leg at a region spaced from the base, said tongue having a first curved surface spaced from said leg, said leg having a second curved surface, said first and second curved surfaces having corresponding radii emanating from said axis, said first and second surfaces being adapted to engage a stanchion.

13. The rail of claim 12 wherein the first and second curved surfaces are segments of circles, the diameter of the circle of the first curved surface being smaller than the diameter of the second curved surface.

14. The rail of claim 12 wherein the cantilevered tongue depends toward the base such that the leg, base and tongue enclose a generally trapezoidal region therebetween.

15. The rail of claim 12 including a rib upstanding from said base at a location spaced from said leg, the leg being cantilevered to the base at an angle thereto and extending over the base.

16. The rail of claim 15 wherein the base has a surface facing said cantilevered leg, said surface sloping upward toward the tongue and the rib.

17. A cargo tie down element for use with a cargo carrier rail, said rail comprising a base having a length, an upstanding leg cantilevered over the base along the length thereof and a tongue cantilevered from the leg and spaced from said base along said length to form a generally trapezoidal space along the rail length between the base, leg and tongue, said tie down element comprising:
a cargo tie down portion; and
a rail engaging portion having a generally trapezoidal shape for interlocking with said trapezoidal space, said tie down portion extending from the cargo carrier rail in a direction transverse to said rail length when the tie down portion is secured to the rail.

18. The cargo tie down element of claim 17 wherein said tie down portion is an eyelet.

19. The cargo tie down element of claim 17 wherein said rail engaging trapezoidal portion has a base surface and opposing inclined side surfaces, the base surface terminating at a first end in a V-shaped profile with one of said side surfaces and at a second end in a curved surface, the curved surface being connected to the other of said side surfaces by a shoulder.

20. An automotive cargo carrier comprising:
an elongated rail defining an axis parallel to the rail and having a plurality of surfaces, said rail being adapted for attachment to a vehicle;
means for securing the rail to a vehicle surface;
a stanchion comprising mating first and second members dimensioned to be releasably and slidably secured to said rail for selective displacement along said rail, one of said first and second members having a male pivot means and the other of said members having mating female pivot means forming a pivot axis about which said members pivot relative to each other, said stanchion including means for securing thereto a cargo support crossbar extending transversely of said rail axis, said stanchion members each having a rail engaging surface spaced from said pivot axis and adapted to respectively engage at a different rail surface and, when engaged, permit said first and second stanchion members to pivot together about the axis defined by said rail, one of said rail engaging surfaces being planar and the other being formed by a V-shaped groove defined by inclined side walls extending along the length of the rail along the rail axis, each of said rail surfaces comprising a segment of a circle defined by a common axis about which said rail engaging surfaces rotate; and
means for clamping said male and female pivot means into engagement and said rail engaging surfaces of said first and second members into engagement with said rail surfaces, said rail surfaces being releasably locked to the rail engaging surfaces of said first and second members.

21. The carrier of claim 20 wherein said male and female pivot means include means arranged to lock the first and second members to preclude relative transverse displacement relative to said engagement direction.

22. The carrier of claim 20 wherein said first and second members each include at least one opening which align with each other when the first and second members are clamped, the aligned openings being adapted to receive a cargo tie down strap.

23. The carrier of claim 20 wherein one of the circular segment surfaces of the rail is dimensioned to contact the surfaces of the inclined side walls of said groove.

24. The carrier of claim 20 wherein said means for clamping includes a knob for manual operation, a threaded stud secured to the knob and thread means secured to one of said first and second members into which said threaded stud is secured, said stud passing through the other of said members, said knob including means for inhibiting the loosening of the knob after it is tightened.

25. The carrier of claim 24 wherein said knob is located in a region between said pivot axis and said rail engaging surfaces.

26. The carrier of claim 20 wherein said first and second members are spaced from each other in a peripheral region between said pivot axis and rail axis, said members including side means for enclosing the spacing between said first and second members at said peripheral region.

27. The carrier of claim 26 wherein said side means includes a pair of side members secured to one of said first and second members and adapted to closely receive the other of said first and second members.

28. The carrier of claim 27 wherein the first and second members are substantially trapezoidal in plan view.

29. The carrier of claim 27 wherein the rail has a base, an inclined, upstanding leg and a cantilevered tongue extending from the upstanding end of the leg, one of said rail engaging surfaces being planar and the other comprising a V-shaped groove, the planar surface extending beyond the said groove for abutting said leg in one position of said stanchion relative to said rail.

30. An automotive cargo carrier comprising:
an elongated rail defining an axis parallel to the rail and having a plurality of surfaces, said rail being adapted for attachment to a vehicle;
means for securing the rail to a vehicle surface;
a stanchion comprising mating first and second members dimensioned to be releasably and slidably secured to said rail for selective displacement along said rail, one of said first and second members having a male pivot means and the other of said members having mating female pivot means forming a pivot axis about which said members pivot relative to each other, said stanchion including means for securing thereto a cargo support crossbar extending transversely of said rail axis, said stanchion members each having a rail engaging surface spaced from said pivot axis and adapted to respectively engage a different rail surface and, when engaged, permit said first and second members to pivot together about the axis defined by said rail; and
means for clamping said male and female pivot means into engagement and said rail engaging surfaces of said first and second members into engagement with said rail surfaces, said rail surfaces being releasably locked to the rail engaging surfaces of said first and second members, said first and second members each including at least one opening which align with each other when the first and second members are clamped, the aligned openings being adapted to receive a cargo tie down strap.

* * * * *